(12) United States Patent
Sakamoto (10) Patent No.: US 6,842,900 B2
(45) Date of Patent: Jan. 11, 2005

(54) INFORMATION PROCESSING APPARATUS EXECUTING PROCESSING CORRESPONDING TO NEW THREAD BY REUSING ARRANGEMENT FOR PREVIOUS THREAD

(75) Inventor: Satoshi Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 642 days.

(21) Appl. No.: 09/767,991

(22) Filed: Jan. 23, 2001

(65) Prior Publication Data

US 2001/0032231 A1 Oct. 18, 2001

(30) Foreign Application Priority Data

Apr. 18, 2000 (JP) ...................................... 2000-116073

(51) Int. Cl.⁷ ................................................. G06F 9/46
(52) U.S. Cl. ........................ 718/102; 718/100; 718/104
(58) Field of Search ................................ 718/100, 102, 718/104, 106, 107; 709/100–108

(56) References Cited

U.S. PATENT DOCUMENTS 5,692,193 A * 11/1997 Jagannathan et al. ....... 718/106
5,991,792 A * 11/1999 Nageswaran ................ 718/102
6,535,878 B1 * 3/2003 Guedalia et al. ............... 707/8
6,687,729 B1 * 2/2004 Sievert et al. ............. 718/102

* cited by examiner

Primary Examiner—Meng-Al T. An
Assistant Examiner—Li Zhen
(74) Attorney, Agent, or Firm—Greer, Burns & Crain, Ltd.

(57) ABSTRACT

An information processing apparatus which creates and executes a thread by request from an application program. In the information processing apparatus, a thread-creation-request receiving unit receives from the application program a request for creation of a first thread, a thread creation unit creates the first thread in response to the request received by the thread-creation-request receiving unit, a first thread execution unit executes the first thread created by the thread creation unit, a thread-creation-request holding unit holds the request received by the thread-creation-request receiving unit, when the thread creation unit fails in creation of the first thread, and a second thread execution unit executes processing corresponding to the request held by the thread-creation-request holding unit. When execution of a second thread by the first thread execution unit is completed, the second thread execution unit may execute processing corresponding to the request held by the thread-creation-request holding unit, by reusing an arrangement which is provided for supporting and managing the second thread, without newly creating the first thread in response to the request held by the thread-creation-request holding unit.

3 Claims, 10 Drawing Sheets

INFORMATION PROCESSING APPARATUS EXECUTING PROCESSING CORRESPONDING TO NEW THREAD BY REUSING ARRANGEMENT FOR PREVIOUS THREAD

BACKGROUND OF THE INVENTION

1) Field of the Invention

The present invention relates to an information processing apparatus which creates and executes a thread, as a minimum piece of processing, in response to a request from an application program.

2) Description of the Related Art

The so-called multithreaded OSs (operating systems) enable execution of more than one thread in a program (process). Since threads in a process can share memory resources and the like, transfer of data between the threads is relatively easy.

Figure 10:
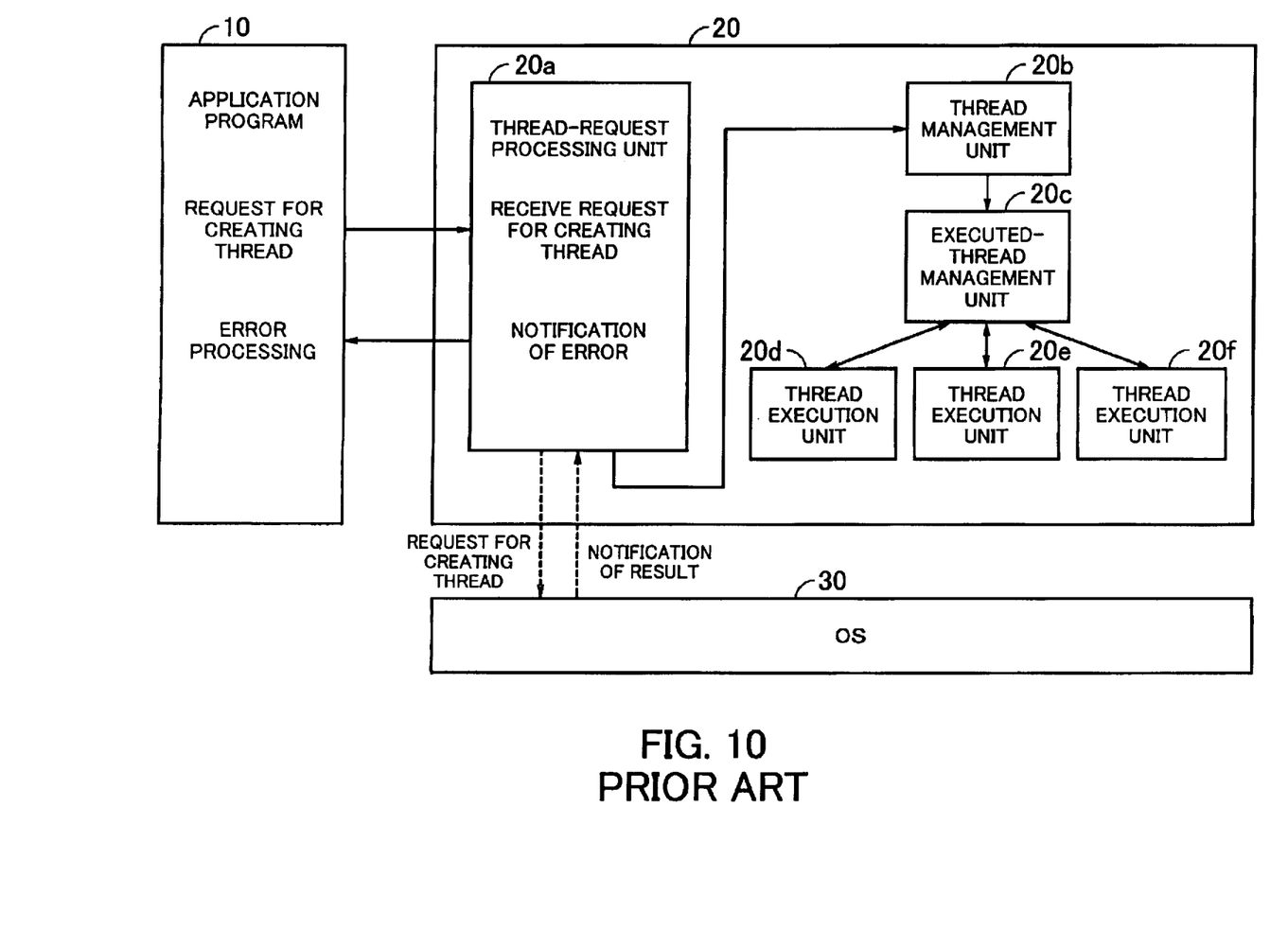
FIG. 10 is a diagram illustrating an example of a conventional information processing apparatus using a multi-threaded OS.

FIG. 10 is a diagram illustrating an example of a conventional information processing apparatus using a multithreaded OS. In FIG. 10, the application program 10 is stored, for example, in a storage device, and executed when necessary. When the thread processing unit 20 receives a request for creation of a thread from the application program 10, the thread processing unit 20 handles the request, and executes the thread. The operating system (OS) 30 receives from the thread processing unit 20 the request for creation of a thread, and creates the thread in response to the request.

In the thread processing unit 20, when the application program 10 sends to the thread processing unit 20 a request for creation of a thread, the thread-request processing unit 20a receives the request, and requests the operating system 30 to create the thread. When the creation of the thread succeeds, the thread-request processing unit 20a informs the thread management unit 20b of the success in creation of the thread. When the creation of the thread does not succeed, the thread-request processing unit 20a informs the application program 10 of the unsuccessful creation as an error. In addition, when the creation of the thread succeeds, the thread management unit 20b delegates the executed-thread management unit 20c to manage the newly created thread. The executed-thread management unit 20c manages execution of threads by the thread execution units 20d to 20f. Each of the thread execution units 20d to 20f is created in order to execute a new thread. When the execution of each thread is completed, the corresponding thread execution unit ceases to exist.

The operations of the construction of FIG. 10 are explained below.

When the application program 10 requests the thread processing unit 20 to create a thread, the thread-request processing unit 20a receives the request, and requests the operating system 30 to create the thread. When the creation of the thread succeeds, a new thread execution unit is created, and the management of the newly created thread is delegated to the executed-thread management unit 20c. That is, the thread management unit 20b supplies information on the newly created thread to the executed-thread management unit 20c so that the executed-thread management unit 20c can manage the thread. Then, the executed-thread management unit 20c assigns the execution of the thread to the newly created thread execution unit.

On the other hand, when the creation of the thread does not succeed, the operating system 30 informs the thread-request processing unit 20a of the unsuccessful creation, and then the thread-request processing unit 20a informs the application program 10 of the unsuccessful creation as an error. The application program 10 sends the request again for creating a thread, to the thread-request processing unit 20a, a predetermined time after the application program 10 receives the notification of the error.

However, since the application program 10 cannot recognize an appropriate time at which a new thread can be created, the application program 10 must frequently make the request for creation of a thread. When the request for creation of a thread is frequently made, processing in the entire system is delayed.

In addition, when the creation of the thread does not succeed, the thread-request processing unit 20a must request the operating system 30 again to create a thread. However, it takes a long time for the operating system 30 to process the request for creation of a thread. Therefore, when the number of requests for creating a thread, which are made to the operating system 30, increases, processing delay in the entire system increases.

SUMMARY OF THE INVENTION

The object of the present invention is to provide an information processing apparatus using a multithreaded operating system, and processing information at increased speed.

(1) According to the first aspect of the present invention, there is provided an information processing apparatus which creates and executes a thread by request from an application program. The information processing apparatus comprises: a thread-creation-request receiving unit which receives from the application program a request for creation of a first thread; a thread creation unit which creates the first thread in response to the request received by the thread-creation-request receiving unit; a first thread execution unit which executes the first thread created by the thread creation unit; a thread-creation-request holding unit which holds the request received by the thread-creation-request receiving unit, when the thread creation unit fails in creation of the first thread; and a second thread execution unit which executes processing corresponding to the request held by the thread-creation-request holding unit.

In the information processing apparatus according to the first aspect of the present invention, when execution of a second thread by the first thread execution unit is completed, the second thread execution unit may execute the processing corresponding to the request held by the thread-creation-request holding unit, by reusing an arrangement which is provided for supporting and managing the second thread, without newly creating the first thread in response to the request held by the thread-creation-request holding unit. For example, such an arrangement is provided by a multithreaded operating system when the multithreaded operating system is requested to create a thread.

(2) According to the second aspect of the present invention, there is provided a method for creating and executing a thread by request from an application program. The method comprises the steps of: (a) receiving from the application program a request for creation of a first thread; (b) creating the first thread in response to the request received in the step (a); (c) executing the first thread created in the step (b); (d) holding the request received in the step (a) when the operation of the step (b) fails; and (e) executing processing corresponding to the request held in the step (d).

In the method according to the second aspect of the present invention, the operation in the step (e) may be performed when execution of a second thread is completed, by reusing an arrangement which is provided for supporting and managing the second thread, without newly creating the first thread in response to the request held in the step (d).

(3) According to the third aspect of the present invention, there is provided a computer-readable storage medium storing a program which is to be executed by a computer, and creates and executes a thread by request from an application program. The program stored in the computer-readable storage medium makes the computer realize the information processing apparatus according to the first aspect of the present invention.

In the computer-readable storage medium according to the third aspect of the present invention, when execution of a second thread by the first thread execution unit is completed, the second thread execution unit may execute the processing corresponding to the request held by the thread-creation-request holding unit, by reusing an arrangement which is provided for supporting and managing the second thread, without newly creating the first thread in response to the request held by the thread-creation-request holding unit.

(4) As explained above, according to the present invention, it is possible to quickly execute processing which is required when creation of a thread fails. Therefore, processing speed in the entire system can be increased.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

An embodiment of the present invention is explained below with reference to drawings.

(1) Principle of Invention

Figure 1:
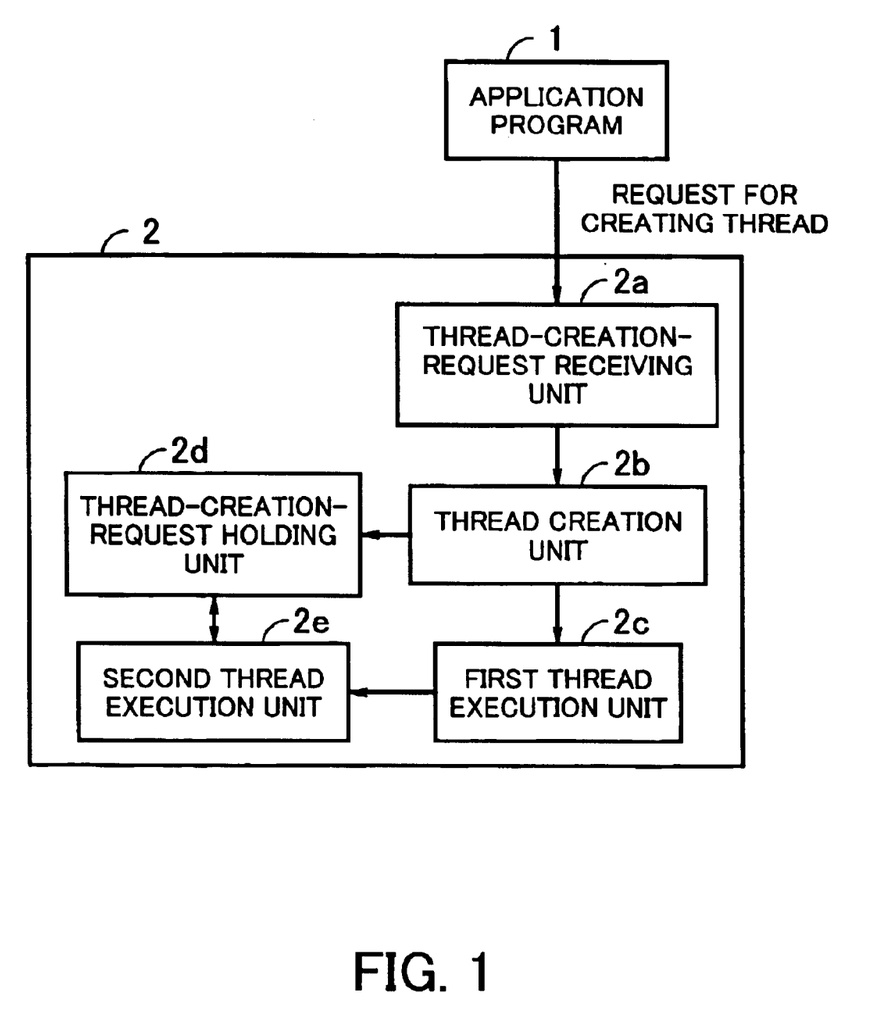
FIG. 1 is a diagram illustrating a basic construction of an information processing apparatus according to the present invention.

FIG. 1 is a diagram illustrating a basic construction of an information processing apparatus according to the present invention. In the construction of FIG. 1, the application program 1 requests the thread processing unit 2 to create a thread, and the thread processing unit 2 creates the thread in response to the request from the application program 1, and executes the thread or processing corresponding to the thread.

The thread processing unit 2 of FIG. 1 comprises a thread-creation-request receiving unit 2a, a thread creation unit 2b, a first thread execution unit 2c, a thread-creation-request holding unit 2d, and a second thread execution unit 2e.

The thread-creation-request receiving unit 2a receives from the application program 1 a request for creation of a thread. The thread creation unit 2b creates the thread in response to the request received by the thread-creation-request receiving unit 2a. The first thread execution unit 2c executes the thread created by the thread creation unit 2b. The thread-creation-request holding unit 2d holds the request when the thread creation unit 2b fails in creation of the thread. The second thread execution unit 2e executes processing corresponding to the request held by the thread-creation-request holding unit 2d.

The operation of the construction of FIG. 1 is explained below.

When the application program 1 requests the thread processing unit 2 to create a thread, the thread-creation-request receiving unit 2a in the thread processing unit 2 receives the request. The thread-creation-request receiving unit 2a supplies the request received by the thread-creation-request receiving unit 2a, to the thread creation unit 2b. The thread creation unit 2b creates the thread in response to the request supplied from the thread-creation-request receiving unit 2a. When the thread creation unit 2b successfully creates the thread, the thread creation unit 2b requests the first thread execution unit 2c to execute the thread created by the thread creation unit 2b. When the first thread execution unit 2c is requested by the thread creation unit 2b to execute the thread, the first thread execution unit 2c executes the thread. When the execution of the thread by the first thread execution unit 2c is completed, the first thread execution unit 2c informs the second thread execution unit 2e of the completion of the execution of the thread.

When the thread creation unit 2b fails to create the thread, the thread creation unit 2b supplies the request supplied from the thread-creation-request receiving unit 2a, to the thread-creation-request holding unit 2d.

For example, when the application program 1 requests the thread processing unit 2 to create a first thread during the execution of a second thread by the first thread execution unit 2c, and the thread creation unit 2b fails to create the first thread, the thread creation unit 2b supplies the request for creation of the first thread, to the thread-creation-request holding unit 2d. The thread-creation-request holding unit 2d receives from the thread creation unit 2b the request for creation of the first thread, and holds the request for creation of the first thread. Thereafter, when the execution of the second thread by the first thread execution unit 2c is completed, the first thread execution unit 2c informs the second thread execution unit 2e of the completion of the execution of the second thread. Thus, the second thread execution unit 2e recognizes the completion of the execution of the second thread, and reads out the oldest request from among at least one request for creation of a thread, which is held by the thread-creation-request holding unit 2d. Then, the second thread execution unit 2e starts execution of the thread read out from the thread-creation-request holding unit 2d by reusing an arrangement which is provided for supporting and managing the second thread when the second thread is created by the thread creation unit 2b.

As explained above, in the information processing apparatus according to the present invention, when the creation of a thread fails, a request for creation of the thread is held by the thread-creation-request holding unit 2d, and is thereafter read out and executed when execution of another thread is completed. Therefore, it is unnecessary for the application program to request the thread processing unit 2 again to create a thread when creation of the thread fails. Thus, processing speed of the entire system can be increased.

In addition, since processing corresponding to a request for creation of a thread, which is held in the thread-creation-request holding unit 2d, is executed by reusing an arrangement which is provided for supporting and managing another thread of which execution is completed, it is unnecessary to request the operating system again to create a thread in response to the request held in the thread-creation-request holding unit 2d. Thus, the processing speed of the entire system can be further increased.

Although, in the above explanation, the first and second thread execution units 2c and 2e are separately provided, the functions of the first and second thread execution units 2c and 2e may be realized by one thread execution unit.

(2) Construction of Embodiment

The embodiment of the present invention is explained below.

Figure 2:
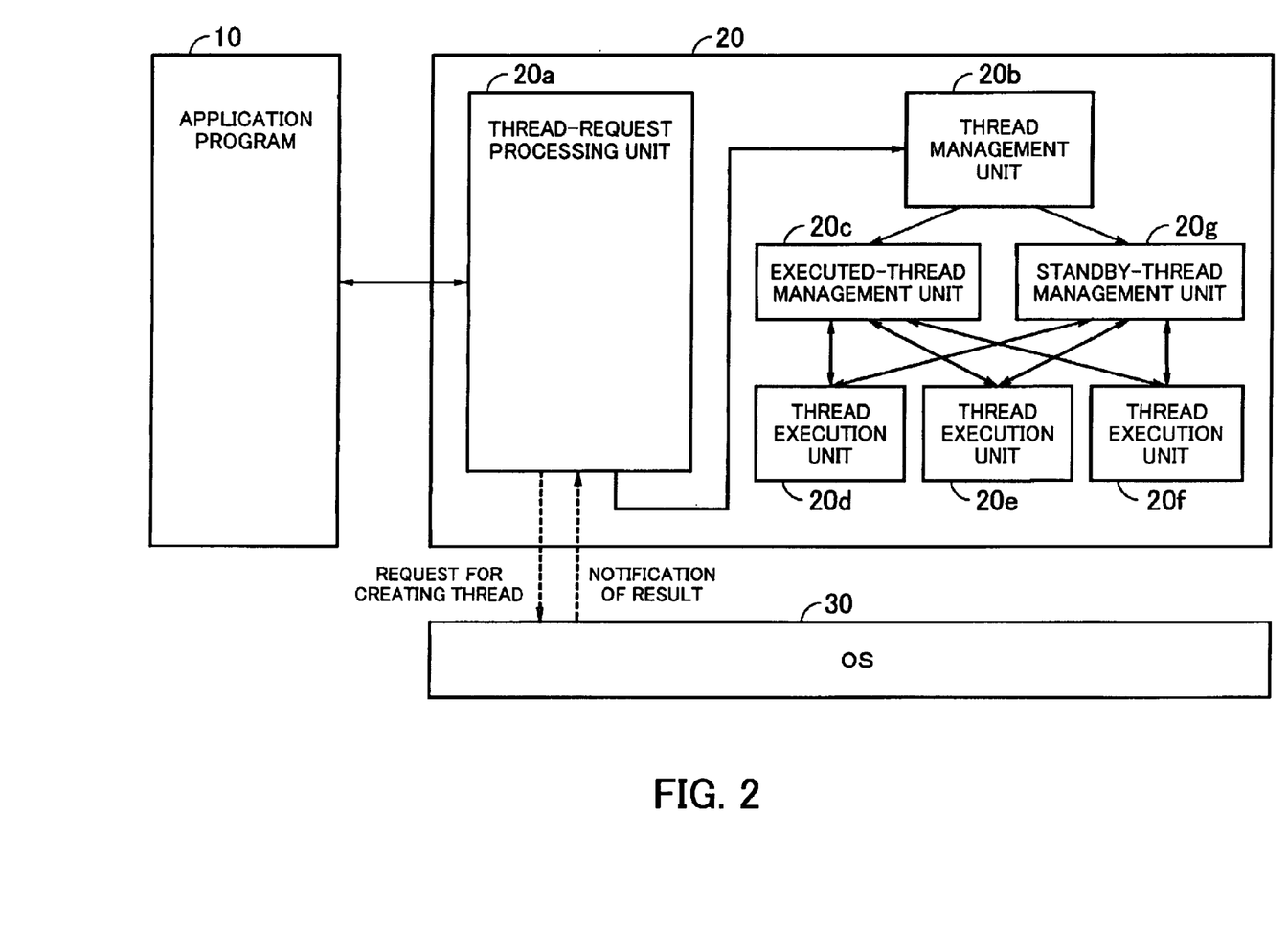
FIG. 2 is a diagram illustrating an exemplary construction of the information processing apparatus as an embodiment of the present invention.

FIG. 2 is a diagram illustrating an exemplary construction of the information processing apparatus as an embodiment of the present invention. In FIG. 2, the application program 10 is stored, for example, in a storage device, and executed when necessary. When the thread processing unit 20 receives from the application program 10 a request for creation of a thread, the thread processing unit 20 executes processing relating to creation of the thread, and executes the thread or processing corresponding to the thread. The operating system (OS) 30 receives from the thread processing unit 20 the request for creation of a thread, and creates the thread in response to the request.

Figure 3:
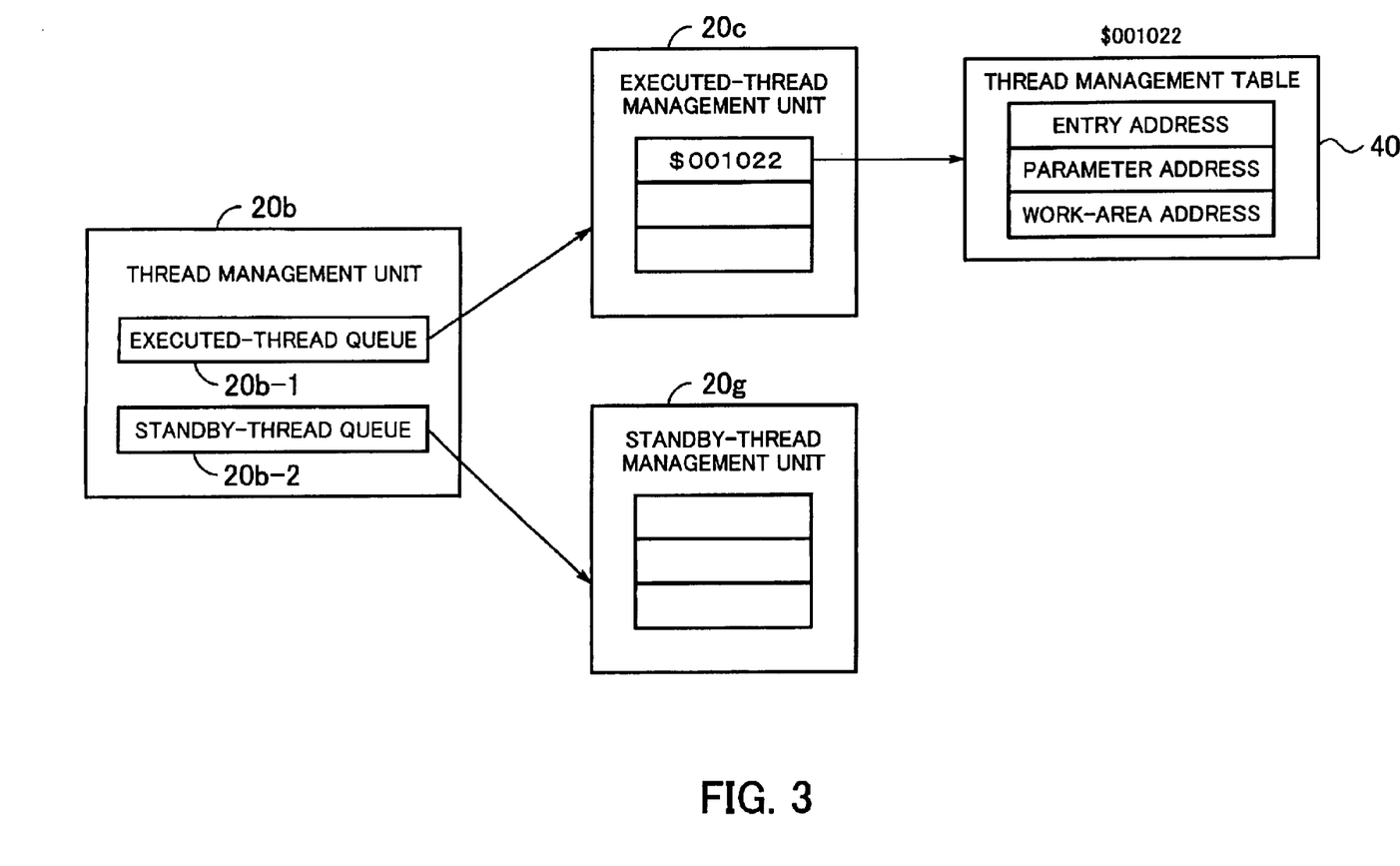
FIG. 3 is a diagram illustrating linkages between the thread management unit, the executed-thread management unit, the standby-thread management unit, and the thread management table, in the first stage of an exemplary sequence of operations of the thread processing unit of FIG. 2.

In the thread processing unit 20, when the application program 10 requests the thread processing unit 20 to create a thread, the thread-request processing unit 20a receives the request, and requests the operating system 30 to create the thread. When the operating system 30 succeeds in the creation of the thread, the thread-request processing unit 20a performs the operations of:

(1) acquiring from the application program 10 information on processing of the thread;

(2) creating a thread management table (for example, as illustrated in FIG. 3);

(3) creating a thread execution unit; and (4) delegating through the thread management unit 20b management of (a request for execution of) the thread to the executed-thread management unit 20c.

Figure 6:
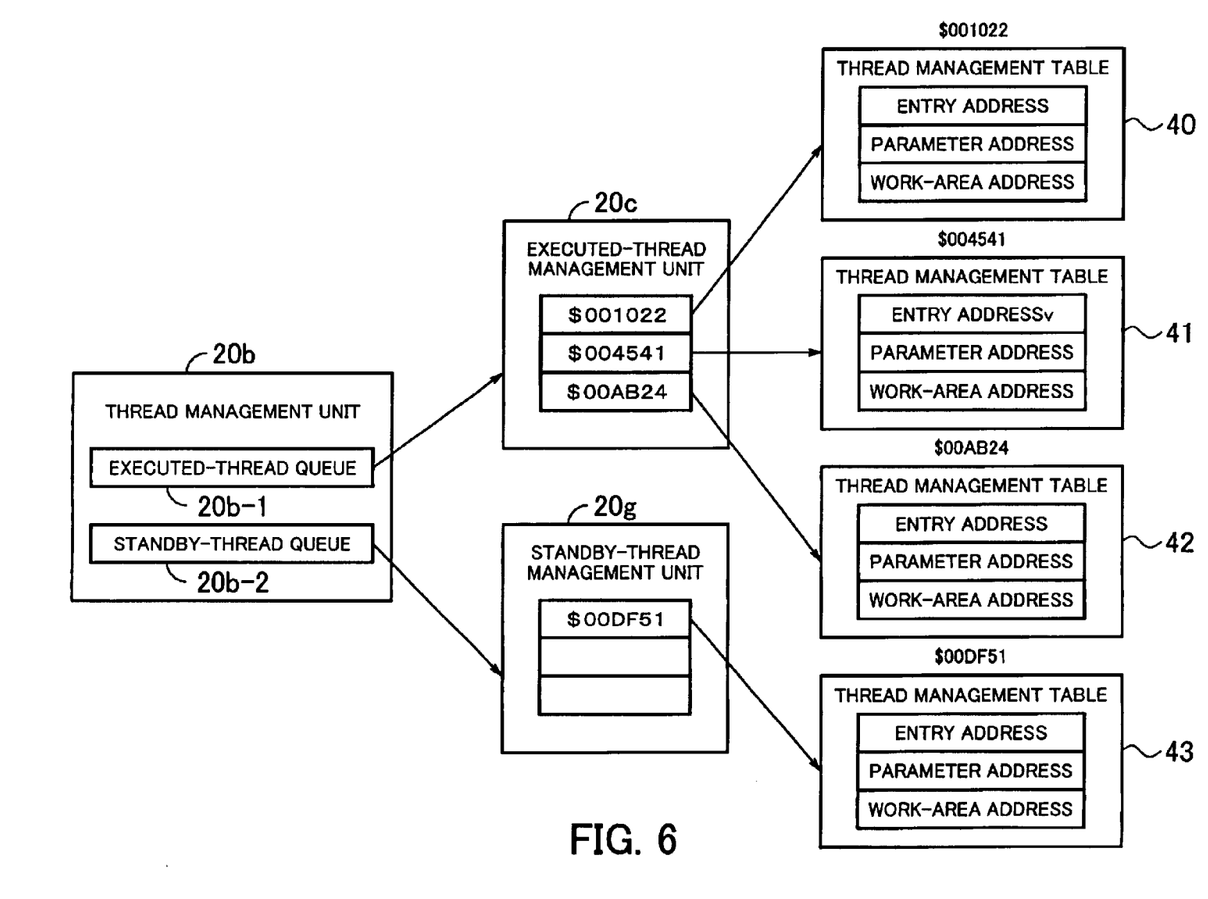
FIG. 6 is a diagram illustrating linkages between the thread management unit, the executed-thread management unit, the standby-thread management unit, and the thread management table, in the fourth stage of the exemplary sequence of operations of the thread processing unit of FIG. 2.

When the operating system 30 fails in the creation of the thread, the thread-request processing unit 20a performs the operations of:

(1') acquiring from the application program 10 information on processing for the thread;

(2') creating a thread management table (for example, as illustrated in FIG. 6); and (3') delegating through the thread management unit 20b management of a request for execution of processing corresponding to the thread, to the standby-thread management unit 20g.

The thread management unit 20b separately manages the above requests for execution delegated by the operations (4) and (3'). That is, the thread management unit 20b registers in the executed-thread management unit 20c at least one (request for execution of) thread which is successfully created, while the thread management unit 20b registers in the standby-thread management unit 20g at least one request for execution of processing corresponding to at least one thread which is not successfully created.

The executed-thread management unit 20c stores the at least one successfully created thread in the order in which the at least one successfully created thread is received, and manages the at least one successfully created thread. The standby-thread management unit 20g stores the at least one request for execution of processing corresponding to at least one thread which is not successfully created, in the order in which the at least one request is received, and manages the at least one request. Each of the thread execution units 20d to 20f is created when the operating system 30 succeeds in creation of a new thread, and executes the new thread. When execution of a thread by one of the thread execution units 20d to 20f is completed, and the standby-thread management unit 20g stores at least one request for execution of processing corresponding to a thread which the application program 10 requests the thread processing unit 20 to create, the thread execution unit acquires one of the at least one request for execution of processing from the standby-thread management unit 20g, and executes the processing. When execution of a thread by one of the thread execution units 20d to 20f is completed, and the standby-thread management unit 20g stores no request for execution, the thread execution unit ceases to exist.

(3) Example of Sequence

An exemplary sequence of operations of the thread processing unit 20 of FIG. 2 is explained below with reference to FIGS. 3 to 7.

FIG. 3 is a diagram illustrating linkages between the thread management unit 20b, the executed-thread management unit 20c, the standby-thread management unit 20g, and the thread management table 40, in the first stage of the exemplary sequence of operations of the thread processing unit 20 of FIG. 2. In the stage illustrated in FIG. 3, one thread (hereinbelow called a first thread) is executed. As illustrated in FIG. 3, the thread management unit 20b includes an executed-thread queue 20b-1 and a standby-thread queue 20b-2. The executed-thread queue 20b-1 is linked to the executed-thread management unit 20c, and the standby-thread queue 20b-2 is linked to the standby-thread management unit 20g. The executed-thread management unit 20c holds an address of a thread management table, which indicates details of processing in the currently executed thread (first thread). Since only one thread (the first thread) is executed in the stage of FIG. 3, only the thread management table 40 is linked to the executed-thread management unit 20c. The thread management table 40 stores an entry address, a parameter address, a work-area address of the thread, and the like.

Figure 4:
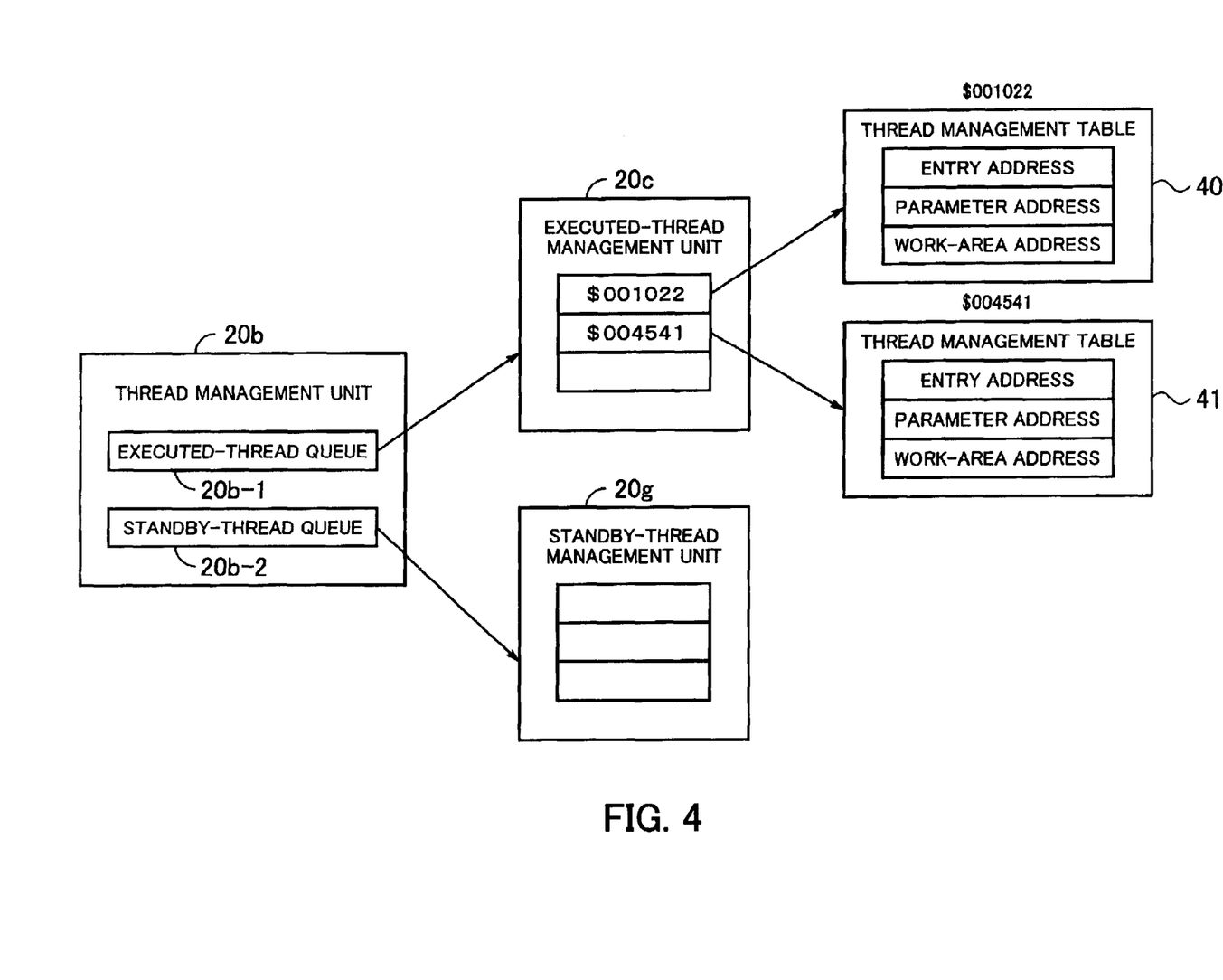
FIG. 4 is a diagram illustrating linkages between the thread management unit, the executed-thread management unit, the standby-thread management unit, and the thread management table, in the second stage of the exemplary sequence of operations of the thread processing unit of FIG. 2.

When the application program 10 requests the thread processing unit 20 to create a new thread (second thread) in the state of FIG. 3, the thread-request processing unit 20a receives the request, and requests the operating system 30 to create the new (second) thread. When the creation of the second thread succeeds, the thread-request processing unit 20a informs the application program 10 of the success in the creation of the second thread, acquires from the application program 10 information on processing to be executed in the second thread, and produces a thread management table 41 as illustrated in FIG. 4, where the acquired information includes an entry address, a parameter address, and a work-area address. Then, the thread-request processing unit 20a supplies to the thread management unit 20b the address "$004541" of the thread management table 41 as well as information on the success in the creation of the second thread. The thread management unit 20b stores the address "$004541" of the thread management table 41 in the executed-thread management unit 20c. Thus, as illustrated in FIG. 4, the executed-thread management unit 20c contains the address $001022 of the thread management table 40 for the currently executed (first) thread and the address "$004541" of the thread management table 41 for the newly created (second) thread.

When an address of a thread management table for a newly created thread is stored in the executed-thread management unit 20c, a thread execution unit is created corresponding to the area at which the address is stored in the executed-thread management unit 20c for the newly created thread, and execution of the newly created thread is started. In this example, the thread execution unit 20e is created for the second thread, and the thread execution unit 20e starts execution of the second thread.

Figure 5:
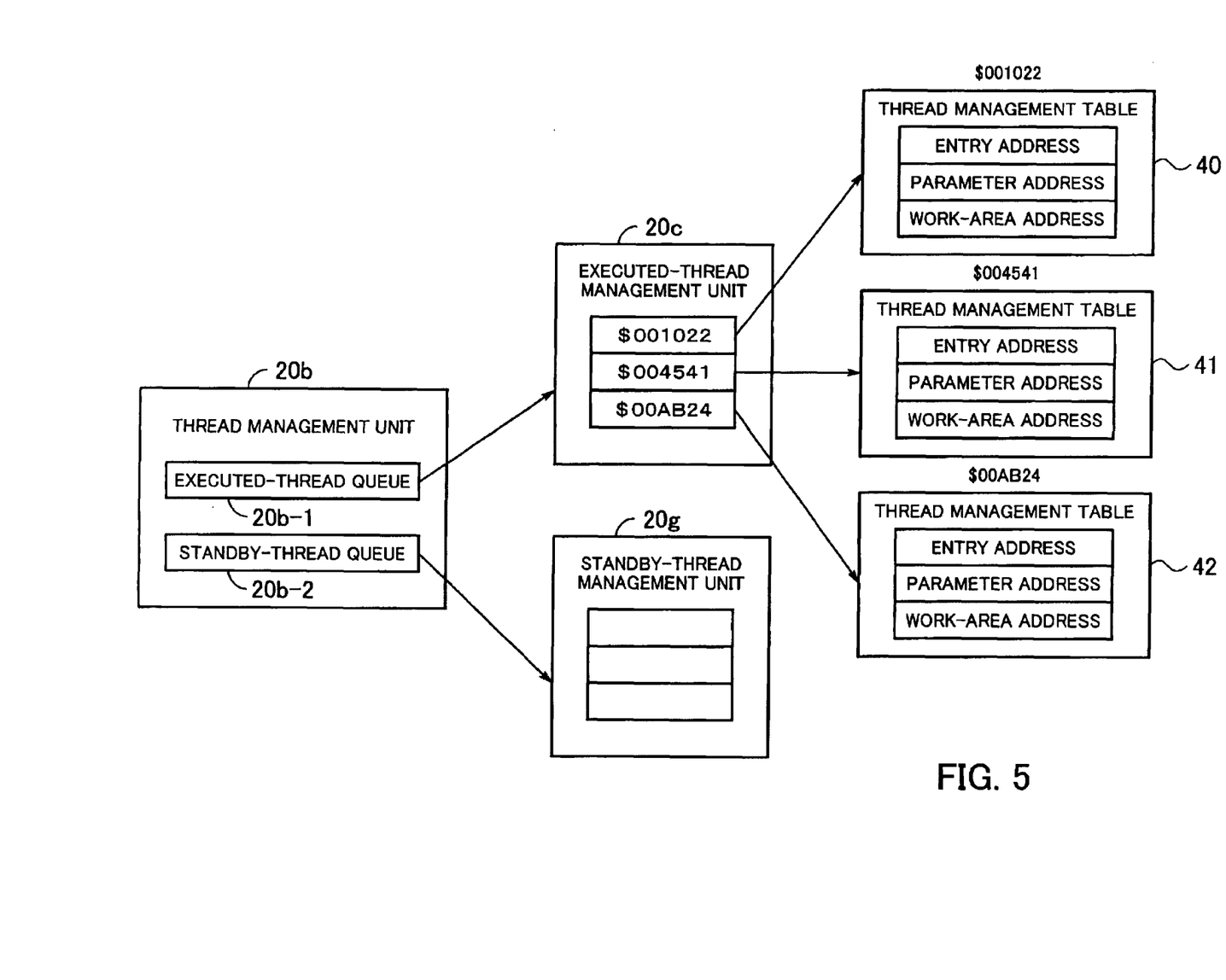
FIG. 5 is a diagram illustrating linkages between the thread management unit, the executed-thread management unit, the standby-thread management unit, and the thread management table, in the third stage of the exemplary sequence of operations of the thread processing unit of FIG. 2.

Next, when the application program 10 requests the thread processing unit 20 to create a new (third) thread in the state of FIG. 4, the third thread is successfully created in a similar manner to the creation of the second thread, a thread management table 42 is produced for the third thread, and the address "$00AB24" of the thread management table 42 is stored in the executed-thread management unit 20c, as illustrated in FIG. 5. In addition, a new thread execution unit (e.g., the thread execution unit 20f) is created, and the third thread is executed.

Thereafter, when the application program 10 requests the thread processing unit 20 to create a new (fourth) thread in the state of FIG. 5, the thread-request processing unit 20a requests the operating system 30 to create the fourth thread. However, since the three threads are currently executed, the operating system 30 informs the thread-request processing unit 20a that the operating system 30 does not allow creation of a further thread. Nevertheless, the thread-request processing unit 20a informs the application program 10 that the requested thread is successfully created, and acquires from the application program 10 information on processing to be executed in the fourth thread, and produces a thread management table 43 as illustrated in FIG. 6. Then, the thread-request processing unit 20a supplies to the thread management unit 20b the address "$00DF51" of the thread management table 43. In this case, the thread management unit 20b stores the address "$00DF51" of the thread management table 43 in the standby-thread management unit 20g.

Figure 7:
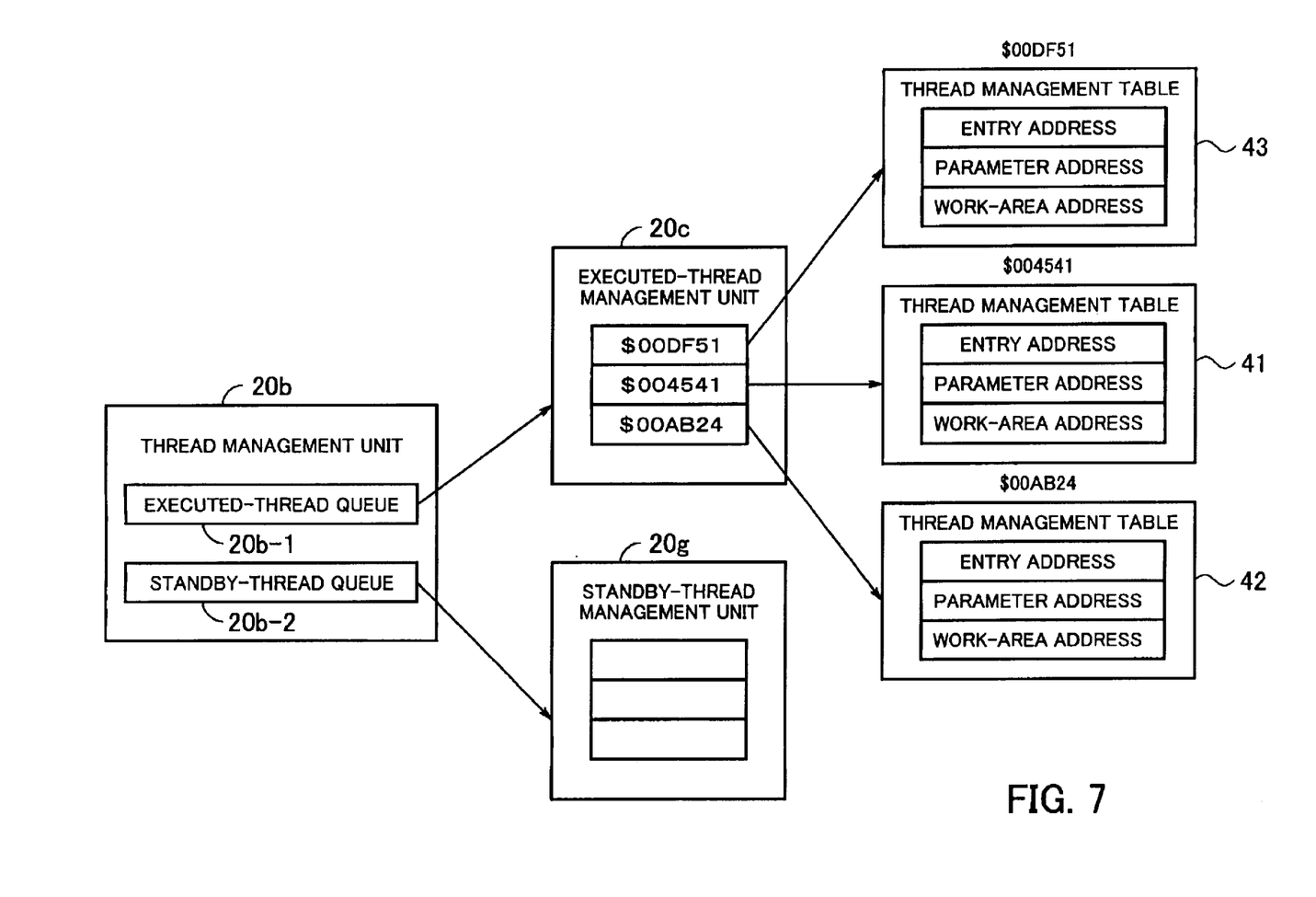
FIG. 7 is a diagram illustrating linkages between the thread management unit, the executed-thread management unit, the standby-thread management unit, and the thread management table, in the fifth stage of the exemplary sequence of operations of the thread processing unit of FIG. 2.

When the execution of the (first) thread corresponding to the thread management table 40 is executed by the thread execution unit 20d, and the execution of the first thread is completed in the state of FIG. 6, the thread execution unit 20d refers to the standby-thread management unit 20g, and determines whether or not the standby-thread management unit 20g stores at least one address. Since, in this example, the standby-thread management unit 20g stores the address "$00DF51," the thread execution unit 20d acquires the address "$00DF51," stores the acquired address in the area of the executed-thread management unit 20c corresponding to the thread execution unit 20d, where the top area of the executed-thread management unit 20c corresponds to the thread execution unit 20d. Thus, the thread management table 43 is linked to the executed-thread management unit 20c as illustrated in FIG. 7. Then, the thread execution unit 20d executes processing corresponding to the requested (fourth) thread by referring to the corresponding thread management table 43.

As explained above, in the embodiment of the present invention, a request for creation of a thread is stored in the standby-thread management unit 20g when the creation of a requested thread fails. When the state of the thread processing unit 20 changes so as to enable processing which is to be executed in the requested thread, the request stored in the standby-thread management unit 20g is moved to the executed-thread management unit 20c, and the processing corresponding to the requested thread is executed. Therefore, the load imposed on the application program 10 is reduced, and the processing speed of the entire system can be increased.

In addition, when execution of a thread by a thread execution unit managed by the executed-thread management unit 20c is completed, processing corresponding to a standby request is assigned to the thread execution unit. Therefore, it is unnecessary to create a thread again in response to the standby request. Thus, the processing speed of the entire system can be increased.

(4) Flow of Thread-request Processing Unit

A sequence of the operations performed by the thread-request processing unit 20a is explained below with reference to FIG. 8.

In step S1, the thread-request processing unit 20a determines whether or not the application program 10 requests the thread processing unit 20 to create a thread. When yes is determined in step S1, the operation goes to step S2. When no is determined in step S1, the operation in step S1 is repeated. In step S2, the thread-request processing unit 20a requests the operating system 30 to create the thread. In step S3, the thread-request processing unit 20a determines whether or not the creation of the thread succeeds. When yes is determined in step S3, the operation goes to step S4. When no is determined in step S3, the operation goes to step S5. In step S4, the thread-request processing unit 20a registers in the executed-thread management unit 20c information relating to the thread which is successfully created. In step S5, the thread-request processing unit 20a registers in the standby-thread management unit 20g information relating to the thread which is not successfully created. In step S6, the thread-request processing unit 20a determines whether or not the sequence of FIG. 8 is to be continued. When yes is determined in step S6, the operation goes back to step S1. When no is determined in step S6, the sequence of FIG. 8 is completed.

(5) Flow of Thread Execution Unit

A sequence of the operations performed by each of the thread execution units 20d to 20f is explained below. The explanation is provided with reference to FIG. 9 for the case of the thread execution unit 20d as an example.

Figure 9:
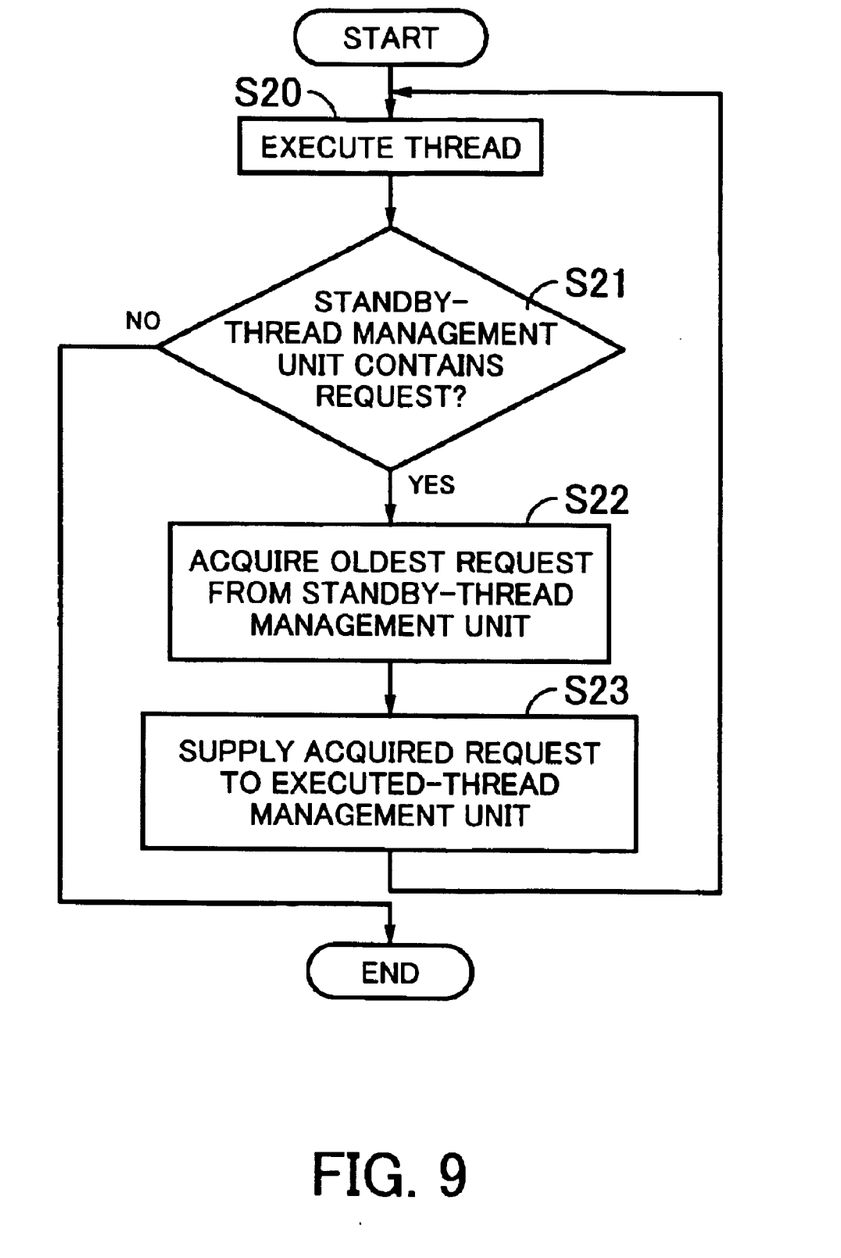
FIG. 9 is a diagram illustrating an example of a sequence of operations performed by a thread execution unit.

In step S20, the thread execution unit 20d executes a thread. In step S21, the thread execution unit 20d refers to the standby-thread management unit 20g, and determines whether or not the standby-thread management unit 20g stores at least one request for execution. When yes is determined in step S21, the operation goes to step S22. When no is determined in step S21, the sequence of FIG. 9 is completed. When the sequence of FIG. 9 is completed, the thread execution unit 20d ceases to exist. In step S22, the thread execution unit 20d acquires the oldest one of the at least one request for execution stored in the standby-thread management unit 20g. In step S23, the thread execution unit 20d supplies the request acquired in step S22 to the executed-thread management unit 20c, and the operation goes to step S20.

Figure 8:
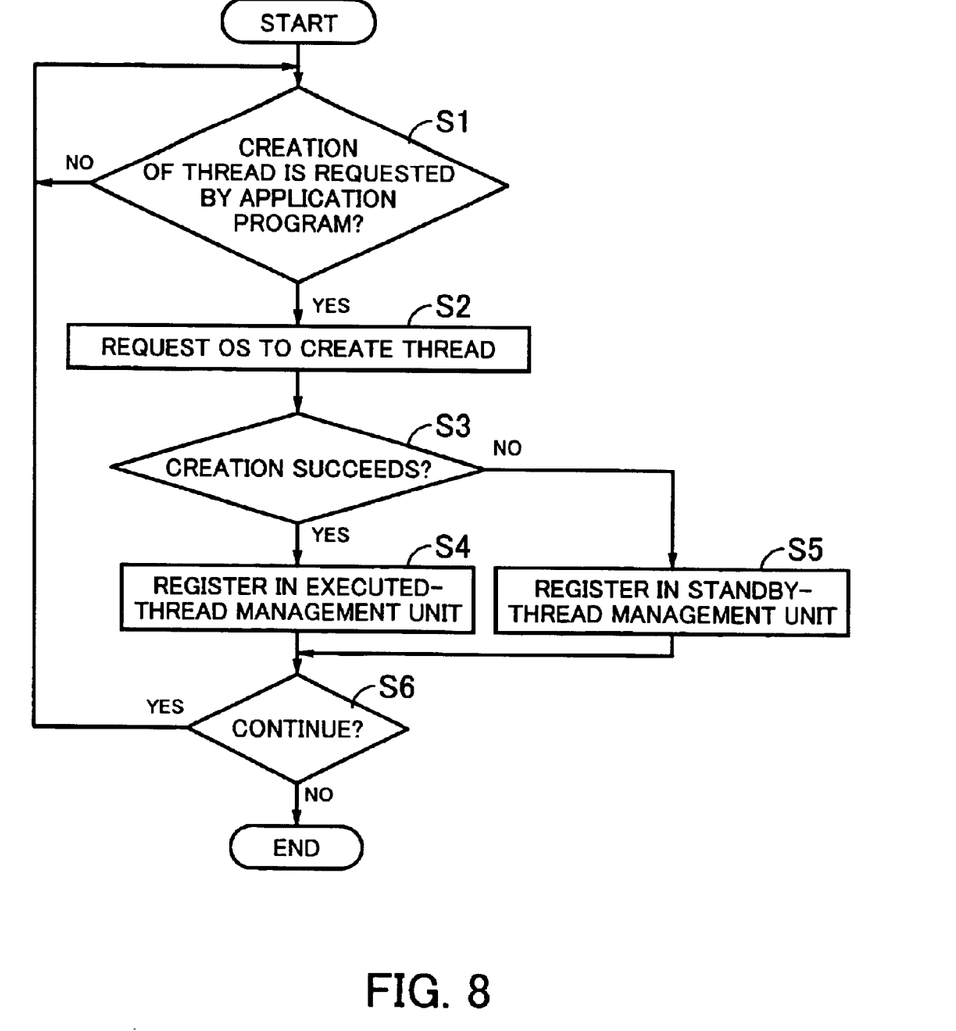
FIG. 8 is a diagram illustrating an example of a sequence of operations performed by a thread-request processing unit.

As described above, the functions of the present invention can be realized by the sequences of FIGS. 8 and 9.

(6) Other Matters (i) Although the above explanations are provided for the case wherein only one application program requests the thread processing unit 20 to create a thread, the present invention can be applied to an information processing apparatus in which more than one application program is concurrently executed.

(ii) Although the thread processing unit 20 of FIG. 2 can have at most three thread execution units, the present invention can be applied to information processing apparatuses including a thread processing unit which can have an arbitrary number of thread execution units.

(iii) The functions of the information processing apparatus according to the present invention can be realized by a computer. The functions of the information processing apparatus can be written as a program, which can be stored in a computer-readable storage medium. The functions can be realized by a computer by executing the program. The computer-readable storage mediums may be a magnetic storage device, a semiconductor memory, or the like. In order to put the program into the market, the program may be stored in a portable storage medium such as a CD-ROM (compact disk read only memory) and a floppy disc. Alternatively, the programs can be stored in a storage device belonging to a first computer, and transferred to a second computer connected through a network to the first computer. When the program is executed by a computer, the program can be stored in a hard disk drive or the like belonging to the computer, and loaded into a main memory of the computer.

(iv) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

(v) All of the contents of the Japanese patent application, No. 2000-116073 are incorporated into this specification by reference.

What is claimed is:

1. An information processing apparatus which creates and executes a thread by request from an application program, comprising:

a thread-creation-request receiving unit which receives from said application program a request for creation of a thread;

a thread creation unit which creates said thread in response to said request received by said thread-creation-request receiving unit;

a first thread execution unit which executes said thread created by said thread creation unit;

a thread-creation-request holding unit which holds said request received by said thread-creation-request receiving unit, when said thread creation unit fails in creation of said thread; and a second thread execution unit which executes processing corresponding to said request held by said thread-creation-request holding unit, wherein, when execution of another thread by said first thread execution unit is completed, said second thread execution unit executes said processing corresponding to said request held by said thread-creation-request holding unit by reusing an arrangement which is provided for supporting and managing said another thread, without newly creating a thread in response to said request held by said thread-creation-request holding unit.

2. A method for creating and executing a thread by request from an application program, comprising the steps of:

(a) receiving from said application program a request for creation of a thread;

(b) creating said thread in response to said request received in said step (a);

(c) executing said thread created in said step (b);

(d) holding said request received in said step (a) when the operation of said step (b) fails; and (e) executing processing corresponding to said request held in said step (d)

wherein the operation in said step (e) is performed when execution of another thread is completed, by reusing an arrangement which is provided for supporting and managing said another thread, without newly creating a thread in response to said request held in said step (d).

3. A computer-readable storage medium storing a program which is to be executed by a computer, and creates and executes a thread by request from an application program, said program makes said computer realize:

a thread-creation-request receiving unit which receives from said application program a request for creation of a thread;

a thread creation unit which creates said thread in response to said request received by said thread-creation-request receiving unit;

a first thread execution unit which executes said thread created by said thread creation unit;

a thread-creation-request holding unit which holds said request received by said thread-creation-request receiving unit, when said thread creation unit fails in creation of said thread; and a second thread execution unit which executes processing corresponding to said request held by said thread-creation-request holding units wherein, when execution of another thread by said first thread execution unit is completed, said second thread execution unit executes said processing corresponding to said request held by said thread-creation-request holding unit, by reusing an arrangement which is provided for supporting and managing said another thread, without newly creating a thread in response to said request held by said thread-creation-request holding unit.

* * * * *